Oct. 24, 1939.    W. RUTHVEN    2,177,461
MOLDING OR SHAPING DIE
Filed Sept. 25, 1937
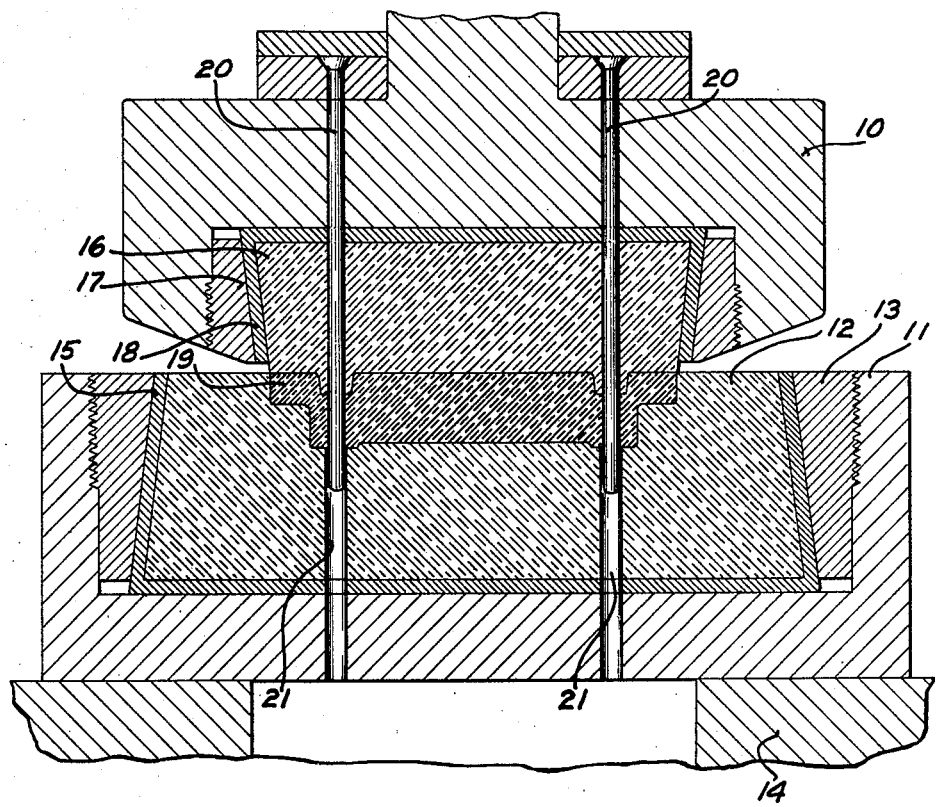
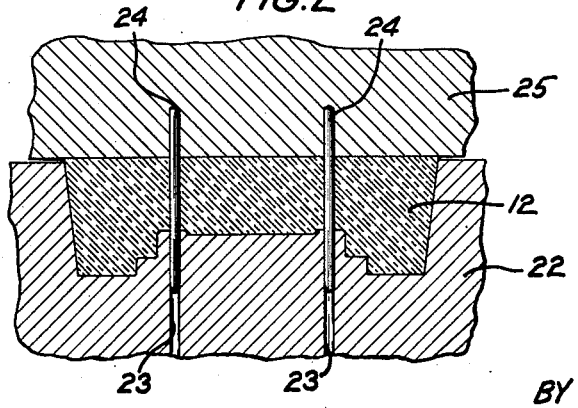
INVENTOR
W. RUTHVEN
BY Emery Robinson.
ATTORNEY Patented Oct. 24, 1939

2,177,461

UNITED STATES PATENT OFFICE 2,177,461

MOLDING OR SHAPING DIE

William Ruthven, Oak Park, Ill., assignor to Western Electric Company, Incorporated, New York, N. Y., a corporation of New York Application September 25, 1937, Serial No. 165,649

2 Claims. (Cl. 18—34)

This invention relates to molding or shaping dies, and particularly to molding or shaping dies for forming ceramic or plastic articles, such as electrical insulators, insulating bases for electrical devices and the like.

Ceramic or plastic articles used for electrical insulating purposes are commonly formed from molding or shaping dies between which the ceramic or plastic materials are pressed into desired shape or form and thereafter permitted to dry in the air or furnace baked. The molding or shaping dies are costly to manufacture as they are usually machined to the desired configuration from high grade steel. Moreover molding and shaping dies of steel for molding and pressing articles from ceramic or plastic materials quickly wear and become useless because of the abrasive action of the materials being molded or shaped which in the case of ceramic materials contain in substantial amounts abrasive materials, such as sand and the like.

The object of this invention is to overcome these objectionable features in the construction of molding or shaping dies for use in press molding or shaping of ceramic or plastic materials and to provide means for manufacturing molding or shaping dies which are readily replaced and which will not be as susceptible to abrasive action as molding or shaping dies heretofore used.

A further object of the invention is to provide the new molding or shaping dies in simple form for use with forming presses already in use.

In attaining these objects a master form or matrix of machined steel is formed of the desired die configuration from which any desired number of molding or shaping dies of moldable materials, such as abrasive resistant glass, Pyrex glass or like materials can be molded. The glass like molding or shaping dies are thereafter mounted in metal die holders or bases which in some instances can be provided with relatively yieldable sealing materials, such as rubber or Woods metal between the glass dies and the holders to withstand the shock of pressing by giving a cushioning effect when the die presses are in operation.

Other objects and advantages of the invention will be understood by reference to the following specifications and accompanying drawing, in which Fig. 1 is a cross-section of dies of this invention, and Fig. 2 is a cross-section of a master or matrix for forming the dies of this invention.

In the drawing the usual simple form of press is shown by way of illustration. Referring to Fig. 1 the upper and lower die holders are indicated at 10 and 11. The lower die 12 of glass like material is set into the die holder or base 11 of metal by means of the removable wedge 13 shown by way of illustration as being threaded into the holder 11. The die holder 11 is secured to the press structure 14 in any well known manner. In many instances it is desirable to insert between the glass die 12 and its holder 11 some slightly yielding material 15, such as Woods metal, rubber or the like, for the purpose of giving a cushioning effect to the dies during the pressing action.

The upper die 16 of glass material is set into the holder 10 by means of removable wedge 17 threaded therein and backed by yieldable material 18 similar to the mounting of die 12.

Ceramic articles are manufactured by pressing into numberless shapes and forms and an insulating base block 19 is illustrated as being formed between the dies 12 and 16, although the dies can be of any desired shape. This type of base block is provided with holes or apertures therethrough for screws or other securing means and to provide these apertures punches 20 are secured to the upper holder 10 and upper die 16 which enter holes or apertures 21 in the lower die 12. These holes or apertures 21 are extended through the lower die holder 11 to provide an escapement for the surplus materials punched from the article being molded.

The molding or shaping dies 12 and 16 are made from some moldable or cast material, such as any form of abrasive resisting glass, one form of which might be Pyrex glass and like materials adapted to be easily formed into the form of dies by any method, such as molding or casting.

The lower die 12 is illustrated in Fig. 2 as being molded from glass or like material in a master or matrix. The master or matrix mold has a lower half 22 which is machined to the desired configuration of the die 12 and is provided with holes or apertures 23 for the punches or pins 24 of the upper half 25 of the master or matrix mold.

The glass or like substance while in a plastic state is placed in the cavity of the lower half 22 of the master or matrix mold. The upper half 25 of the master or matrix mold is then brought into contact with the lower half to form the glass or like substance into desired shape. After shaping, the glass or like material is permitted to solidify, forming a die. It is necessary to form a master or matrix for the upper refractory die 16 which would be the same as that shown in Fig. 2, except that the machined cavity for the refractory substance to be molded would be of different configuration.

It will be readily seen that molding or shaping dies can be easily, quickly and economically formed from various substances in a master or matrix mold, thus eliminating the heretofore process of machining each individual die from steel.

While the invention is illustrated and described more particularly with reference to molding dies constructed from glasslike materials, the invention is not confined thereto but is intended to cover any other uses, materials or modifications within the scope of the appended claims.

What is claimed is:

1. In a molding die, the combination of a replaceable relatively thick wedge shaped glass section having a working face with the desired configuration formed thereon and an opposite base portion of greater surface area than the working face, an outer holder, a wedge for securing the glass section to the outer holder, and a filling of relatively yielding material positioned between the wedge and glass section and between the outer holder and base portion of the glass section.

2. In a molding die, the combination of a replaceable relatively thick wedge shaped glass section having a working face with the desired configuration formed thereon and an opposite base portion of greater surface area than the working face, an outer holder having an internally threaded circular cavity to receive the glass section, a circular threaded wedge having an inner configuration conforming to that of the glass section securing the glass section to the holder, and a filling of relatively yielding material between the base of the glass section and the holder and the sides of the glass section and the inner surface of the wedge.

WILLIAM RUTHVEN.